July 3, 1951    M. B. RASMUSSON    2,559,463
CONFECTION MAKING APPARATUS
Filed June 27, 1945    5 Sheets-Sheet 1

INVENTOR.
MARLIN B. RASMUSSON
BY George B. White
ATTORNEY

July 3, 1951  M. B. RASMUSSON  2,559,463
CONFECTION MAKING APPARATUS
Filed June 27, 1945  5 Sheets-Sheet 2
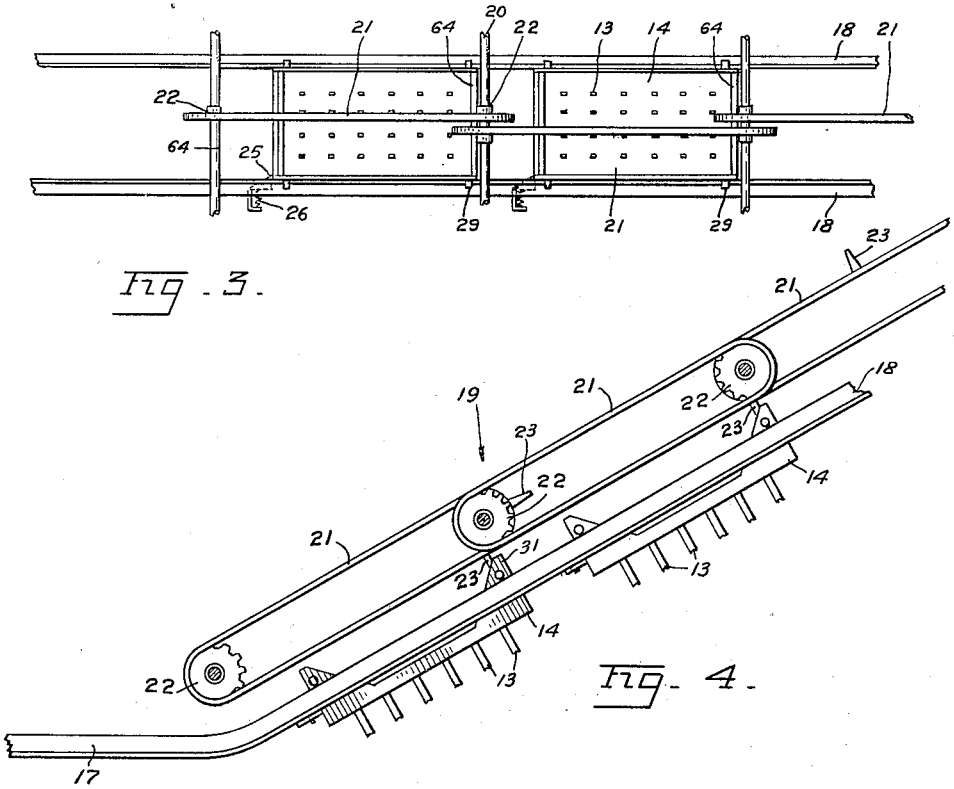
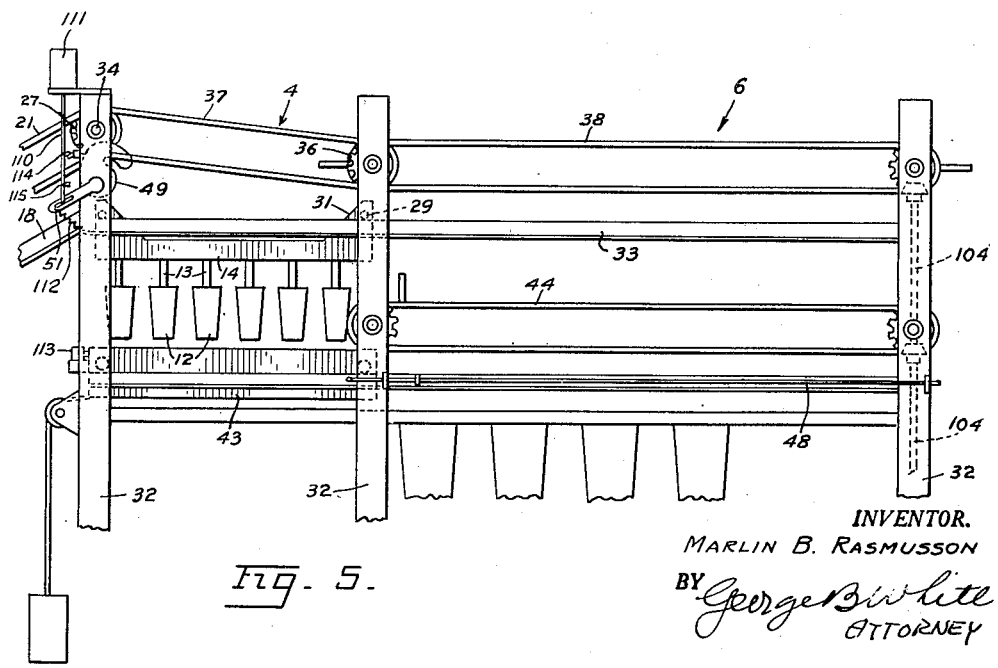
INVENTOR.
MARLIN B. RASMUSSON
BY George B. White
ATTORNEY July 3, 1951  M. B. RASMUSSON  2,559,463
CONFECTION MAKING APPARATUS
Filed June 27, 1945  5 Sheets-Sheet 3
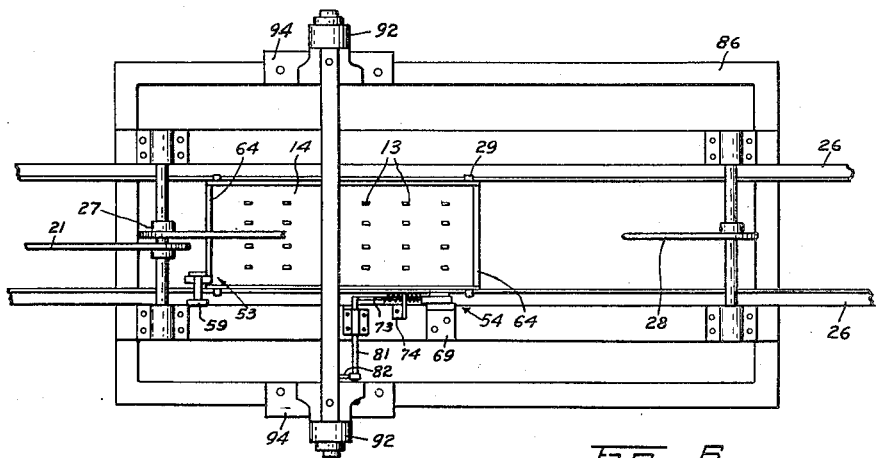
Fig. 6.
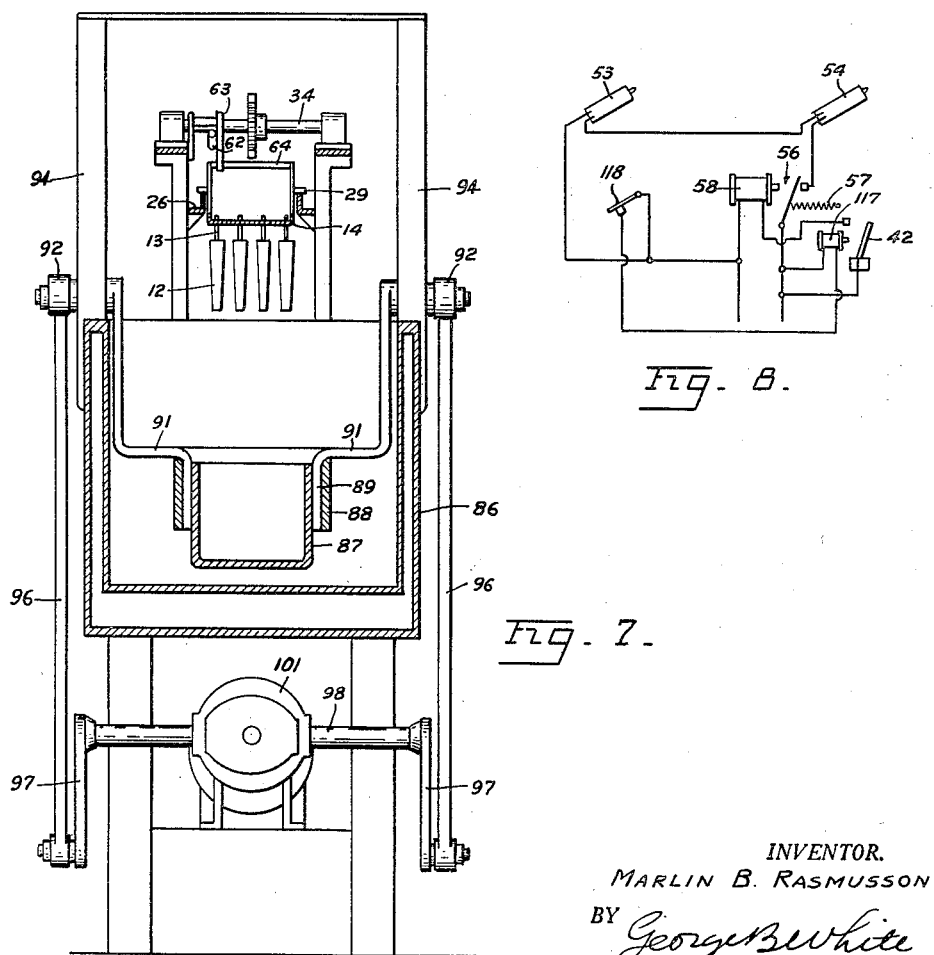
Fig. 7.
Fig. 8.
INVENTOR.
MARLIN B. RASMUSSON
BY George B. White
ATTORNEY INVENTOR.
MARLIN B. RASMUSSON
BY George B White
ATTORNEY July 3, 1951  M. B. RASMUSSON  2,559,463
CONFECTION MAKING APPARATUS
Filed June 27, 1945  5 Sheets-Sheet 5
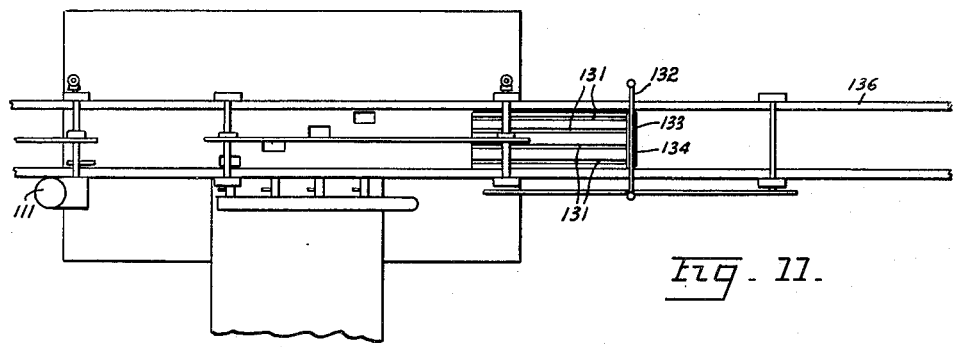
Fig. 11.
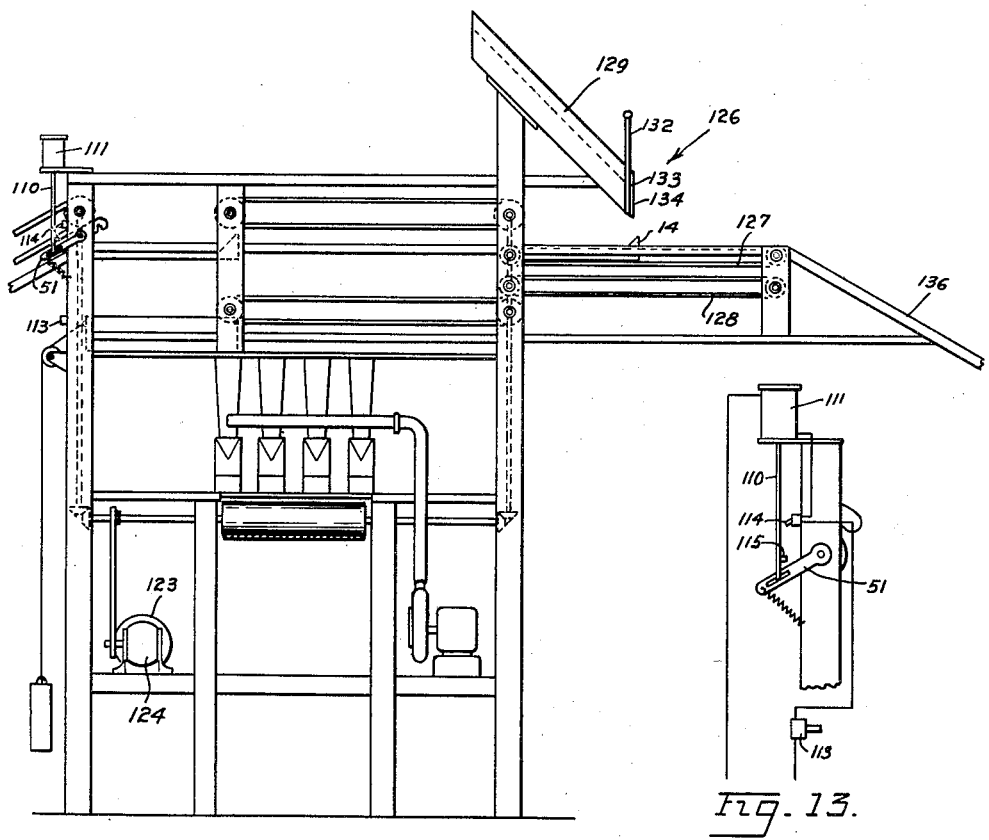
Fig. 12.
Fig. 13.
INVENTOR.
MARLIN B. RASMUSSON
BY George B White
HIS ATTORNEY Patented July 3, 1951

2,559,463

UNITED STATES PATENT OFFICE 2,559,463

CONFECTION MAKING APPARATUS

Marlin B. Rasmusson, Sacramento, Calif., assignor to Vitafreze Equipment, Inc., Sacramento, Calif., a corporation of California Application June 27, 1945, Serial No. 601,880

7 Claims. (Cl. 107—8)

This invention relates to an apparatus for making frozen confections and the like.

The primary object of this invention is to provide an apparatus for making and treating frozen confections and the like with the minimum of manual handling of the confections and without waste.

Features of this invention are: the simultaneous operation of all the treating steps and the synchronized advancing of the confections in a series of holders to the various steps of treatment; the controlling of all the steps in accordance with the timing of the transfer of the confections from a holder to the carrier of a distributing mechanism for the packaging of the product; the holding of the confections under refrigeration all the time between the treating steps, and simultaneously and automatically advancing the entire series of holders through said areas of refrigeration to and from the points of treatments; the predetermined control of the coating of the product during each intermission of movement of the product through the apparatus; the advancing of the holders at intervals by gravity during a part of the path through said apparatus; the alternate utilization of gravity and lifting mechanism for advancing the product through the apparatus; and a novel dipping or coating mechanism synchronized with the rest periods during the general intermittent advance of the product from step to step through the apparatus.

With the foregoing and other objects and features in view, the forms of which are susceptible to modifications, reference is had to the accompanying drawings for the illustrative embodiment of the invention, wherein:

Fig. 3 is a fragmental plane view of the advancing mechanism in one of the refrigerator chambers.

Fig. 4 is a fragmental side view of the advancing mechanism in said refrigerating chambers.

Fig. 5 is a fragmental side view of the separating and distributing mechanism of the device.

Fig. 6 is a top plane view of the dipping mechanism and the advancing means thereabove.

Fig. 7 is a sectional view of the dipping mechanism.

Fig. 8 is a wiring diagram showing the intermittent electric control for the dipping mechanism and a starting control for the advancing mechanism.

Fig. 11 is a plane view of a modified form of the apparatus of the packaging mechanism, showing a device for reloading sticks into the holders.

Fig. 12 is a side view of said modified form of the discharge end of said apparatus, and Fig. 13 is a detail diagrammatic view of the automatic electric separator mechanism.

Figure 1:
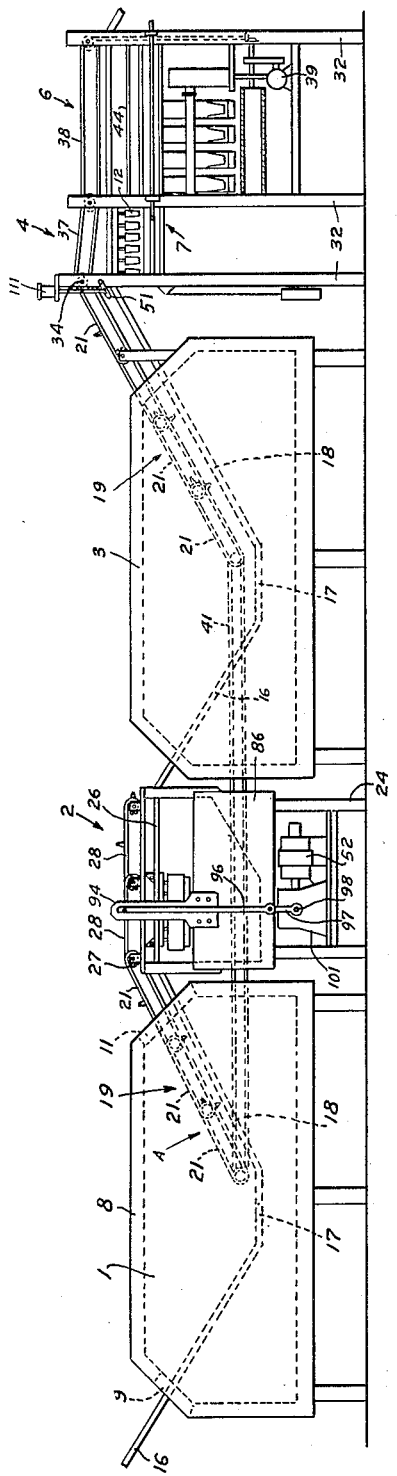
Fig. 1 is a somewhat diagrammatic side view of the apparatus.
Figure 2:
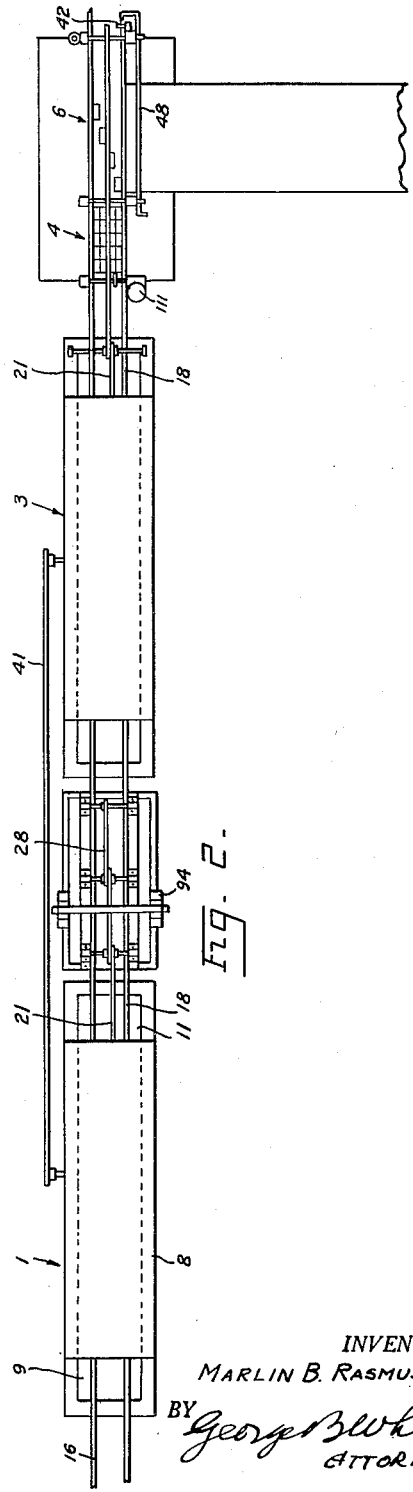
Fig. 2 is a somewhat diagrammatic plan view of the apparatus.
Figure 9:
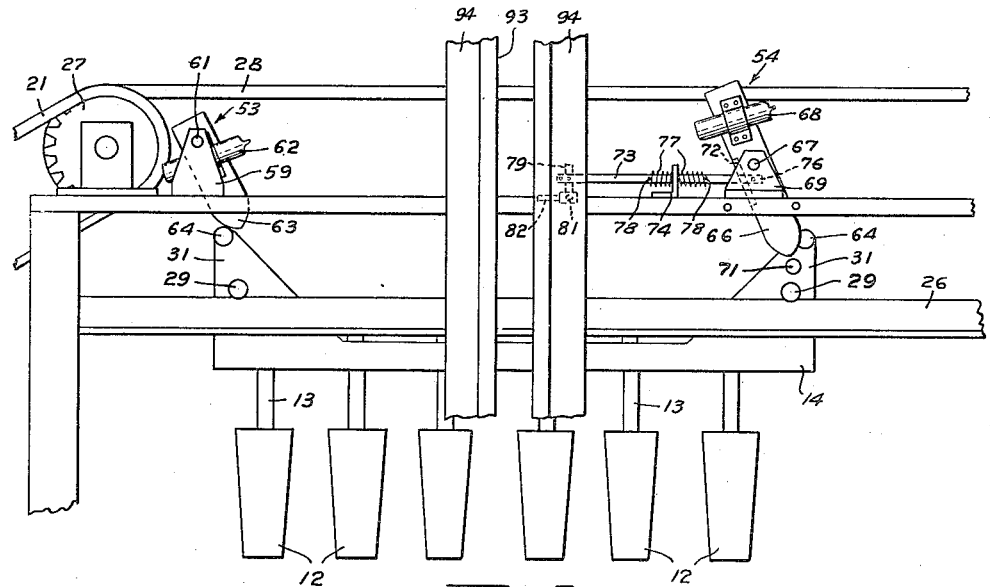
Fig. 9 is a fragmental detailed view of the circuit breakers actuated by a holder above the dipping mechanism.
Figure 10:
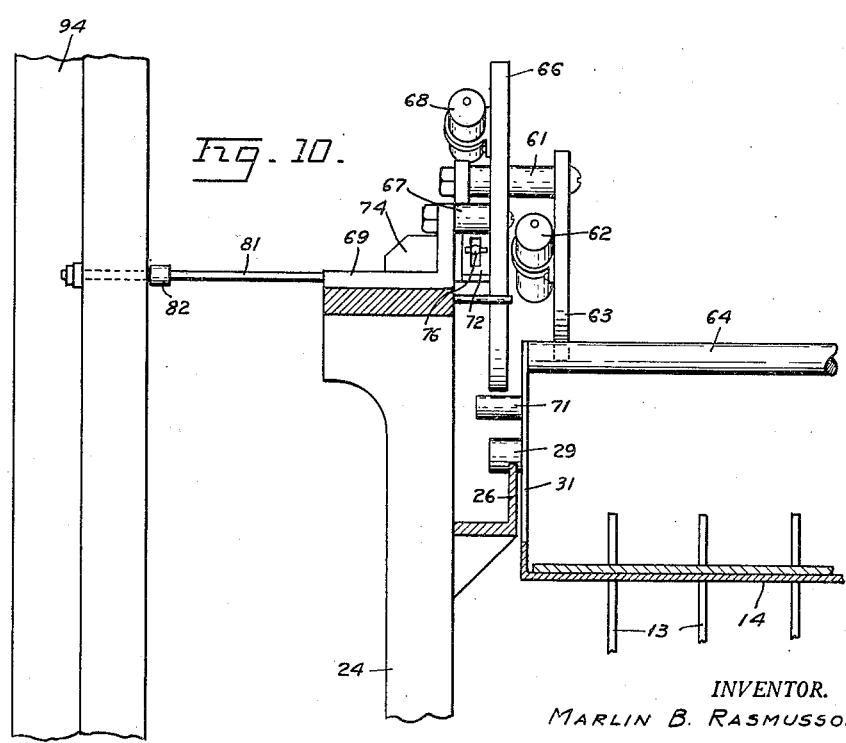
Fig. 10 is a fragmental sectional view of the structure above the dipping mechanism showing the arrangement of the control circuit breakers for said dipping mechanism.

In its general organization the apparatus includes a refrigerated feeding chamber 1, feeding to a dipping or coating mechanism 2; a second refrigerated chamber 3 from which the confections are advanced to a separating mechanism 4 from which latter the product is carried to a packaging mechanism 6 by the carrier of a distributing mechanism 7. The product is fed into the first refrigerated chamber 1 and is intermittently moved through it. Then it is dipped and coated by the coating mechanism 2 during a period of rest between the intermittent advancing motion, and is then advanced by gravity into the second refrigerated chamber 3 from which it is intermittently moved to the separating mechanism 4 where the frozen confections are freed from the stick holders and dropped into a carrier of the distributing mechanism 7 to be carried thereby and distributed into the units of the packaging mechanism 6. The intermittent motion and advancing of the frozen confections throughout the apparatus is synchronized with the motion of said carrier of the carrying mechanism 7 so that the stick holders through the apparatus are at rest while the carrier is at rest and while the frozen confections are separated from the stick holders and transferred into said carrier, and all are set into advancing motion while the carrier moves the frozen confections to the packaging mechanism 6. The coating mechanism 2 is further synchronized to be set into operation by one of the stick holders pushed into position thereon at the time when said stick holder comes to rest at said dipping mechanism 2 and also only when the carrier has completed its carrying movement and commenced its return stroke of movement to said separating mechanism 4.

The first refrigerated chamber 1 is a comparatively long chamber confined by walls 8 and having an intake opening 9 at one end and an outlet opening 11 at its other end. The frozen confections 12 are suspended by sticks 13 frozen into the confections and held in releasable stick holders 14 substantially as shown in my co-pending application Serial No. 535,502, filed May 13, 1944, now Patent #2,535,231 on Method and Apparatus for Making Frozen Confections, of which this application is a continuation-in-part. Each of these stick holders 14 carries a plurality of frozen confections arranged in a predetermined pattern. Rails 16 extend downwardly from the inlet opening 9 of the first refrigerated chamber 1 at an incline toward the middle lower portion of the chamber 1. The angle of incline of the intake rails 16 is such that stick holders 14 placed thereon at the inlet opening 9 slide down by gravity to a substantially horizontal rest rail 17 at the lower end of the intake rails 16. This rest rail 17 is of such length as to accommodate one stick holder 14. The stick holders 14 fed onto the intake rails 16 also push each other downwardly and are held on the inclined rail until the bottom stick holder 14 is lifted away from the rest rails 17. Lift rails 18 extend from the end of the rest rail 17 upwardly and toward the outlet opening 11. Above and along the lift rails 18 is provided a lifting device 19 for engaging the stick holders 14 and for pulling them upwardly on the lift rails 18 and feeding them one by one out through the outlet opening 11.

In the present form the lifting device 19 consists of a plurality of endless conveyors 21 arranged in series above the outlet rails 18. The conveyors 21 are rotated by sprockets 22 which in turn are rotatable on shafts 20 suitably journaled in the opposite walls of the respective chambers. Each conveyor 21 is longer than the length of one stick holder 14. The sprockets 22 are keyed on the respective shafts 20 so as to rotate together, thereby simultaneously driving the entire series of conveyors 21. Each conveyor 21 except the one extended through the outlet 11, has on it a finger 23 adapted to engage the leading end-bracket of a stick holder 14 to pull it upwardly on the rails 18 in the manner described in my said co-pending application. The finger 23 of the lowest conveyor 21 after pulling a stick holder 14 to the end of its stroke leaves the end bracket of said stick holder 14 and comes to rest after each operation at a point somewhat past and above the stick holder 14 as shown particularly in Fig. 4. The finger 23 on each of the higher conveyors 21 is so positioned so that it stops in substantial engagement with the leading end-bracket of a stick holder 14 therebelow and is ready to pull said holder 14 upwardly on the rails 18. The highest conveyor 21, which extends through the outlet 11 has two fingers 23 thereon which are spaced apart at a distance substantially equal to the distance between the end-brackets of a stick holder 14, so that while one finger 23 will pull the stick holder 14 by its leading end-bracket up and out through the outlet 11, the following finger 23 will engage the stick holder 14 at its rear end-bracket after the leading finger 23 released the leading end-bracket of the stick holder 14, and pushes the stick holder 14 upon the top rails 26 above the coating mechanism 2. Each of the lifting conveyors 21 rotate 360° during each intermittent operation. In other words the finger 23 of the first conveyor is carried over 180° before it engages the next stick holder 14 on the rest rail 17 and then continues its movement pulling the stick holder 14 therewith into the lowest position shown in Fig. 4; finally this finger 23 passes upwardly from the stick holder 14 and stops in the position shown in Fig. 4. The fingers 23 on the other conveyors 21 also rotate from the position shown in Fig. 4 back to the position shown in said figure. During the short intervals that the stick holders 14 are free from the respective fingers 23, the back slip of the stick holders 14 is prevented by a suitable catch on the rails 18, such as a tiltable spring catch 25 pivoted on one end of the rails 18 and normally positioned in an obstructing position by a spring 26. When a stick holder 14 passes over such a catch 25 it pushes the catch 25 against the spring 26 and out of the way. The stick holder 14 then bears against the right angle side of the catch 25 and is held thereby until it is engaged by the finger 23 of the next conveyor 21, and is pulled another step upward on the rails 18. All of the conveyors turn simultaneously and move the stick holders 14 in the spaced relation shown in Fig. 4. The spacing between the stick holders 14 on the rails 18 is determined by the relative length of the conveyors 21 with respect to the length of the stick holder 14. The stick holders 14 are continuously fed and replaced on the rails 17 by gravity fed from the intake rails 16.

The dipping mechanism 2 is supported on a frame 24, on the top of which are rails 26 leading from the outlet end of the lifting device 19 to the intake end of the intake rails 16 of the second refrigerated chamber 3. The outlet end of the first lifting device 19 extends beyond the outlet opening 11 of the chamber 1 and the uppermost conveyor 21 thereof works on the shaft and with the sprocket 27 of the adjacent end of a conveyor 28 above the rail 26 of the dipping mechanism 2. This top conveyor 28 may be made sufficiently long to extend to the entire length of the top rails 26, although in the herein illustration the length is covered by a pair of shorter top conveyors 28 working together. The top conveyor 28 nearest the inlet of the next chamber 3 has longitudinally spaced fingers thereon similar to the fingers 23 of the uppermost lifting conveyor 21 for engaging the stick holders 14 and advancing them first over the drip tank of the dipping mechanism 2 and then onto the intake rails 16 of the second chamber 3 with the same intermittent movements as the advancing of the stick holders 14 through the first chamber 1. The stick holders 14 are suspended on the rails 26 as well as on the other rails herein, by suitable projections 29 on their leading and trailing end-brackets 31 in the manner described in my said co-pending application. The first top conveyor 28 next to the outlet 11 operates as a transmission to the second top conveyor 28.

The second refrigerating chamber 3 is herein shown as identical with the first refrigerating chamber 1 and the description of the first chamber applies also to the second chamber 3. The refrigerating means for these chambers 1 and 3 may be of any suitable type and are not shown.

The separating mechanism 4 and the packaging mechanism 6 are preferably supported on a frame 32, along the top of which extend rails 33 for guiding the stick holders 14 along the top of said frame 32. The outlet or lift rails 18 of the second chamber 3 extend to and connect with the said top rails 33. The uppermost conveyor 21 of the lifting device 19 of the second chamber 3 works on the same shaft 34 and together with the sprocket 36 of a top conveyor 37 above the rails 33 at the separating mechanism 4. Another top conveyor 38 is connected to and works with the previous top conveyor 37 and extends above the remaining portion of the top rails 33 for carrying away the empty stick holders 14 from the separating mechanism 4.

The driving of all the conveyors in the device and in its various parts is accomplished in synchronism, and intermittently, so that a stick holder 14 is stopped on the rails 26 in registry with the dipping mechanism 2 and another stick holder 14 is stopped on the rails 33 in registry with the separating mechanism 4 after each intermittent movement of the co-ordinated conveyors in the various parts of the device. The other stick holders 14 passing through the apparatus are stopped and carried in sequence to be consecutively brought into said registering positions. This simultaneous driving is accomplished in the illustrative embodiment by an electric motor 39 driving the packaging mechanism 6 and drivingly connected to the lifting mechanism 19 of the second refrigerated chamber 3 so as to rotate the conveyors 21 thereof in a contra-clockwise direction viewing Fig. 1. A suitable transmission, such as a chain and sprocket transmission 41 connects the lowermost conveyor 21 in the second chamber 3 to the shaft of the lowermost conveyor 21 in the first chamber 1 for driving the lifting mechanism 19 therein in synchronism with the movement on the second chamber 3. The transmissions and drives may be, of course, of any suitable type, such as chain and sprockets, overhead pulleys, several synchronized motors, gears, transmissions and the like, but the ratio of transmission is such that a stroke of the carrier of movement corresponds to an advance of the other conveyors substantially to the length of a stick holder 14.

The electric circuit of all the drives is controlled by a suitable switch 42. In the present embodiment the switch 42 is actuated by the distributing mechanism 7 so that the stick holders 14 are advanced every time the carrier of said distributing mechanism carries a load of separated frozen confections away from the separating mechanism 4 and distributes the same into the units of the packaging mechanism 6 and the advance movement is stopped when said carrier reaches the end of its stroke away from the separating mechanism and begins its return movement toward the separating mechanism 4. The carrier 43 of the distributing mechanism 7 is carried by an endless conveyor 44 driven by said motor 39 and controlled by the same switch 42. This switch 42 is turned "on" by a rod 48 slidably held on the frame 32 and located conveniently for manipulation by the operator who operates the separating mechanism in this apparatus. When the operator pulls the switch rod 42 the latter abuts and turns "on" the switch 42 to close the circuit of the drive motor 39 for moving the carrier 43 over the packaging mechanism 6. When the carrier 43 reaches the end of its travel in the direction away from the separating mechanism 4, it abuts the switch 42 and turns it "off" breaking the electric circuit of the motor 39. The carrier 43 is returned to its initial position by a counterweight, or the like, as shown in my aforesaid copending application.

During the period of rest after the switch 42 is turned "off," there are two steps performed on the frozen confections. The confections held in the stick holder 14 located on the rails 33 above the separating mechanism are released from the stick holder 14 and dropped into the carrier 43 therebelow; and the confections held in the stick holder 14 above the dipping mechanism 2 are suitably dipped or coated. The releasing of the confections from the stick holder 14 at the separating mechanism 4 is accomplished in the herein embodiment by a releasing cam 49 manipulated by a handle 51 to shift a releasing device in the stick holder 14 of the type and in the manner described in my said copending application, so as to free the sticks of the frozen confections from the stick holder 14 and allow the dropping of the confections downwardly into the carrier 43.

The dipping of the confections is accomplished by the dipping mechanism 2. This dipping mechanism is electrically controlled and actuated. The electric circuit of the dipping mechanism is controlled so that it will not be closed except when the switch 42 of the advancing motor circuit is open. The dipping mechanism 2 includes a motor 52, the electric circuit of which is controlled by switches 53 and 54 actuated by the stick holder 14 on the rails 26. An auxiliary circuit breaker 56 is connected in series with the second switch 54. This auxiliary circuit breaker 56 is normally urged into circuit closing position by a spring 57 or the like, and is opened by an electromagnetic relay 58. This electromagnetic relay is connected in series with the switch 42 which controls the motor 39 for the moving of the stick holders 14. When the switch 42 is closed and the stick holders 14 are in motion the electromagnetic relay 58 is energized and opens the circuit breaker 56, thereby it prevents the operation of the dipping motor 52 and of the dipping mechanism 2 while the stick holder 14 is in motion, even though the switches 53 and 54 are closed by a stick holder 14. When the advancing motor switch 42 is open and the stick holders 14 are held at rest, the auxiliary switch 56 is closed and the dipping mechanism 2 is permitted to operate if there is a stick holder 14 in position to close the other switches 53 and 54. This connection co-ordinates the dipping operation with the general intermittent advance of the stick holders 14 through the apparatus.

The switches 53 and 54 at the dipping mechanism are so called mercoid switches. Switch 53 which is closer to the direction from which the stick holder 14 approaches on the rails 26, is pivoted on a bracket 59 which extends above the rail 26. The pivot 61 on which said switch 53 is suspended is above the mercoid tube 62 of the switch, therefore this switch is returned by gravity to the "off" position whenever it is not engaged by a stick holder 14. The mercoid tube 62 is mounted on a pendulum arm 63 which suspends the switch on the pivot 61. As described in my aforementioned pending application, each stick holder 14 has a bracket each at the leading end and at the trailing end thereof extended above the level of the stick holder 14, and each bracket holds a cross rod 64 which rods 64 are engaged by the respective fingers 23 on the respective conveyors 21 for pulling and advancing the stick holders 14 on the respective rails. The pendulum arm 63 of the switch 53 extends in the path of these cross rods 64 so that it is tilted by said cross rods 64. When the leading cross rod 64 passes by the switch 53 it temporarily closes the switch 53, but said switch 53 immediately returns to "off" position when released. When the trailing end of the stick holder 14 reaches the switch 53 so that the cross rod 64 abuts the pendulum arm 63 of the switch 53 it tilts the switch so as to close the circuit through the mercoid tube 62, and holds it closed as long as the stick holder 14 remains in aligned position with the dipping mechanism 2 to be hereinafter described.

The other switch 54 is not in position for being pushed by the leading cross rod 64 of the leading end of the stick holder 14. This switch 54 has an arm 66 which is pivoted on a pivot 67 substantially intermediate between the ends of the arm 66. The mercoid tube 68 of this switch 54 is mounted above the pivot 67. The balance of the arm 66 is such that the arm 66 and the switch 54 thereon remain in any set position until force is applied to turn the arm 66 to another position. The pivot 67 is on a bracket 69 extended from the same rail as the other bracket 59. In the present illustration the lower end of the arm 66 of the switch 54 extends further down and to one side of the stick holder 14 and is engaged by a special knob 71 extended from the leading bracket of said stick holder 14 for turning "on" the switch 54. On the switch arm 66 is an abutment 72. A horizontal rod 73 is slidably mounted in a bracket 74 above said rails. A head 76 on the end of the rod 73 is opposite the abutment 72 so that when the rod 73 is pulled in a direction opposite to the direction of movement of the stick holder 14, then it engages the abutment 72 and pulls the switch arm 66 to the vertical "off" position. This is accomplished by reason of the fact that the abutment 72 is slightly below the pivot 67. The rod 73 is kept in a balanced position by opposed coil springs 77 which are on the opposite sides of the bracket 74 and abut against respective pins 78 spaced from said bracket 74. The other end of the rod 73 is connected to a lever arm 79 on a shaft 81, which shaft 81 has on it a horizontal arm 82, which latter is in turn abutted by the dipping mechanism on the down stroke of the dipper, as hereinafter to be described, for turning the shaft 81 and the lever arm 79 so as to pull the rod 73 sufficiently to return the switch 54 into "off" position.

The dipping mechanism 2 in the present illustration includes the frame on which is mounted a tank 86 for holding the coating mixture such as liquid chocolate solution. The tank 86 is elongated and the bottom of the tank 86 nearer to the second refrigerating chamber 3 is inclined upwardly and toward said chamber so that the chocolate that may drip back into the tank 86 flows downwardly to the portion of the tank 86 which is beneath the position at which the stick holder 14 comes to rest. In this last portion of the tank 86 is disposed a dipping tank 87. This dipping tank 87 has an inner circumference slightly larger than the area of a stick holder so that it can be raised over the frozen confections held in a pattern in the stick holder 14. The dipping tank 87 is surrounded by an apron 88, which is spaced from the walls of the dipping tank 87 and is held in spaced position by connecting elements 89 which are preferably welded in place. Overflow of liquid from the dipping tank 87 flows down in said space inside the apron 88. For the reciprocation of the dipping tank 87 a pair of brackets 91 are extended from the opposite side of the dipping tank 87 upwardly and outwardly, the lower end of said brackets 91 being fixedly secured into the space between the apron 88 and the respective portions of the walls of the dipping tank 87. The lower portion of these brackets 91 serve as connecting elements and spacers between the apron 88 and the walls of the dipping tank 87. Each of brackets 91 has its upper end connected to a cross head 92. The cross heads are guided in vertical reciprocation in opposite slots 93 in spaced vertical guides 94 extended upwardly from the tank 86 to above the position of the supporting structure for the stick holder 14 heretofore described. Out of each cross head 92 extends a connecting rod 96, the lower end of which is connected to an eccentric 97, which latter in turn is connected to a drive shaft 98. A motor 52 disposed beneath the tank 86 drives the shafts 98 through suitable reduction gearing 101. The operation of the motor 52 is accomplished in the manner heretofore stated as controlled by the switches 53 and 54 and the relay 58. When both switches 53 and 54 are closed by a stick holder 14, and the relay circuit breaker 58 is also closed because the driving motor 39 for the advancing mechanism is at rest, then the rotation of the dipping motor 52 to 180 degrees lifts the dipping tank 87 up to the frozen confections suspended from the stick holder 14 so as to dip said frozen confections in the coating solution in the tank 87. At about the beginning of the downward movement of the cross heads 92, one of the cross heads strikes the arm 82 for returning the switch 54 in circuit opening position. It is to be noted that the knob 71 on the leading end of the stick holder 14 moves past the lower end of the arm 66 before the stick holder comes to a stop so as to allow the return of the arm 66 to the circut opening position. The momentum of the drive will carry the dipping tank 87 back to and slightly past the lower end of its stroke beneath the level of the chocolate solution in the tank 86 ready for the next dipping operation.

At the separating mechanism 4 is provided a releasing cam 49 having a handle 51 thereon arranged in the manner described in my copending application to engage the relatively movable clamping portion of the stick holder 14 and shift it for releasing the sticks of the frozen confections from the stick holder 14 which is above the carrier 43. As described in my copending application, this carrier has compartments in it arranged in symmetrical pattern to the pattern of arrangement of the frozen confections held in the stick holder 14. After thus transferring the frozen confections from the stick holder 14 into the carrier 43 the operator pulls the switch rod 48 to turn "on" the switch 42 and sets in operation the motor 39 for driving the conveyor 44 for moving the carrier over the packaging mechanism 6 so that the frozen confections are distributed into the multiple units of the packaging mechanism 6 in the manner described in my copending application.

When the carrier 43 reaches the switch 42 it turns "off" the switch 42 so that the entire operation for the advancing of the conveyors and the stick holders 14 thereon is stopped simultaneously throughout the entire apparatus. It is to be noted that the drive motor 39 is also used for driving the packaging mechanism 6 in the manner described in my copending application. Suitable shafts and gears 104 transmit rotation from the drive motor 39 to the top conveyors 37 and 38, which latter transmit rotation to the endless conveyors 21 on the lifting rail 18 of the second refrigerating chambers 3. A suitable transmission such as the sprocket and chain transmission 41 transmits rotation from the shaft of the lower-most endless conveyor 21 of the second refrigerated chamber 3 to the shaft of the lowermost endless conveyor 21 of the first refrigerated chamber 1. Rotation through the conveyors 21 of the first refrigerated chamber is then transmitted to the top conveyors 28 on the top rails 26 above the dipping mechanism 2 so as to move a stick holder 14 into the dipping position heretofore described and at the same time move another stick holder 14 away from said dipping position and toward the intake of the second refrigerated chamber 3.

In the operation of the device, one or two operators may operate the entire apparatus. The holder at the releasing or separating mechanism 4 controls the movement and treatment of the frozen confections in the stick holders 14 throughout the entire apparatus, namely the operator operates the releasing cam 49 to transfer the treated frozen confections from the stick holder 14 into the carrier 43. The operator then, by pulling the switch rod 48, sets in motion the carrier 43 for distributing the treated frozen confections to the units of said packaging mechanism 6, also operates the packaging mechanism 6 and also advances the conveying mechanisms, and the stick holders 14 thereon, upwardly in the first refrigerated chamber 1 so as to bring a stick holder 14 into the dipping position in the dipping mechanism 2, and also to advance another stick holder 14 from said dipping position toward the intake of the second refrigerating chamber 3 and to the downwardly inclined rail 16 in said second refrigerated chamber 3. Simultaneously the conveyors 21 in the second refrigerating chamber 3 are set in motion for advancing a stick holder 14 to the separating mechanism 4 and in aligned position with the release cam 49. During the operations of the conveyors 21 in said refrigerated chambers 1 and 3 the lowermost conveyors 21 each pick up a stick holder 14 from each rest rail 17 and pull it up to the lowest position on the lift rail 18. Finally the top conveyor 37 at the separating mechanism 4 is also driven for taking the stick holders 14 away from said separating mechanism 4 and to discharge the empty stick holders 14 from the apparatus. Another operator may place the stick holders 14 on to the intake rails of the first refrigerated chamber 1. It must be understood however, that the one operator may deposit considerable numbers of stick holders 14 on the intake rails 16 of the first refrigerated chamber 1, and then the same operator may operate the releasing cam and control intermittent advancement of said stick holders 14 by the pulling of the switch rod 48. The operation is intermittent so that a stick holder 14 comes to rest above the dipping mechanism 2 and another adjacent the releasing cam 49, yet the stick holders 14 are continuously advanced through the apparatus without the need for frequent handling or straightening or manipulating the stick holders 14 from the time that they are introduced at the intake opening of the first refrigerated chamber 1 to the time that the same are discharged packaged from the apparatus. The only operation required is that during each intermission of movement the operator actuate the releasing cam 49 for the transfer of the treated frozen confections from the stick holder 14 into the carrier 43, and then to pull the switch rod 48 for another cycle of operation and advancement of the stick holders through the apparatus.

In order to render the operation of the entire apparatus fully automatic, when so desired, the separating or dumping mechanism 4 is coordinated with and actuated by the carrier 43 when said carrier 43 is returned to its receiving position; and also the main switch 42 is automatically turned "on" through a suitable relay and abutment operated by the dipping tank 87 during its down stroke.

The automatic operation of the separating mechanism 4 is performed by a link 110 which is loosely pivoted at one end to the cam lever 51 and is moved by an electromagnet 111 at its other end. A coil spring 112 is connected to the frame of the machine and to the cam lever 51 for returning the cam lever 51 into its initial position after each operation. The circuit of the electromagnet 111 is controlled by a normally open spring switch 113 located on the frame opposite the initial position of the carrier 43 so that said carrier 43 in its initial position presses the button of the switch 113 into closed position and closes the electric circuit therethrough. A normally closed circuit breaker 114 is connected in series between the switch 113 and the electromagnet 111. The link 110 has a projection 115 thereon to engage and open the circuit breaker 114 after a predetermined upward stroke of the link 110. The circuit breaker 114 is closed after it is released by the link 110, by its own spring mechanism suitably arranged in such a way that the closing of the circuit is delayed until after the carrier 43 moves away from the switch 113. In operation after the carrier 43 is pulled back by its counter-weight, in the manner described in my co-pending application, it abuts against the switch 113 so as to close the electric circuit of the magnet 111, which latter in turn draws the link 110 and the cam lever 51 upwardly, and turns the cam 49 into the position to shift the clamping means in the stick holder 14, and thereby to release the sticks 13 and allow the frozen confections 12 to drop into the compartments of the carrier 43 in the manner described in my co-pending application. When the rest of the mechanism is started for the next cycle of operation the carrier 43 is moved over to the packaging mechanism as heretofore described and will stop the operation of the entire apparatus by turning off the main switch 42 at the far end of its stroke. Every time the carrier 43 is returned to its initial receiving position it actuates the switch 113 and the separating mechanism 4 as heretofore described. During the separating operation the movement of the conveyors of the apparatus is stopped, but the dipping mechanism 2 functions during this period in the manner heretofore described.

For the automatic starting of the apparatus after each intermittent operation, I provide an electromagnet 117 which is located near the main switch 42 and is connected by suitable electric wires to a switch 118 on the abutment arm 82. The switch 118 and the electromagnet 117 are connected in series so that the electromagnet 117 is energized only when the switch 118 is closed when the abutment arm 82 is in its down position. In this position of the arm 82 the circuit of the electromagnet 117 is closed and it draws the switch 42 to circuit closing position thereby starting the operation of the entire apparatus. Although the arm 82 is turned downwardly only momentarily, yet that interval is sufficient to energize the electromagnet 117 and close the switch 42 which latter will remain closed until it is opened by the carrier 43 at the discharge end of its stroke. Thus the entire apparatus will perform one cycle of operation during the period that the switch 42 is closed. Thereafter the entire apparatus is at rest while the dipping mechanism 2 and the separating mechanism 4 are actuated in the manner heretofore described. During the return stroke of the dipping mechanism and after the dipping operation is completed, the switch 42 is again automatically closed and sets the apparatus in motion for another cycle of operation. It is to be noted that whenever there is no stick holder above the dipping mechanism 2 for the operation of the mercoid switches 53 and 54, the system is actuated manually by the switch rod 48. This rod 48 is also used during the beginning of the operation of the machine until a stick holder 14 reaches the dipping mechanism 2 and also for the emptying of the portion of apparatus beyond the dipping mechanism 2 before the apparatus is stopped entirely for the day. Other times the operation of the machine is fully automatic.

A modified form of the invention is illustrated in Figs. 11 and 12. In this form the blower motor is also shown and the transmission mechanism is rotated by a separate motor 123 which is connected by suitable transmission 124 to the various driving mechanisms, in the same manner as heretofore shown. In this form there is a stick reloading mechanism 126 provided at the discharge end of the apparatus. This reloading mechanism consists of an additional conveyor chain 127 and a belt 128 under the conveyor 127. The top run of the belt 128 is spaced below the empty stick holder 14 at the suitable distance to properly locate the sticks 13 in the holes of the stick holder 14. Above this belt 128 is a trough 129 which trough 129 is inclined downwardly and above the position of the stick holder 14 on the discharge conveyor 127. This trough 129 has a plurality of said slots or channels 131 in which are stacked the sticks 13 to move by gravity toward the lower ends of the troughs 129. A gate 132 at the lowest end of the troughs 129 prevents the falling out of the sticks 13, and covers a discharge bottom slot 133 through which the sticks 13 can drop out from the ends of the channels 131 when the gate 132 is lifted. An end wall 134 outside of the gate 132 limits the discharge slot 133. It is to be noted that the channels 131 are spaced apart and arranged in the same way as the holes on the usual stick holders 14 into which the sticks 13 are clamped. The operator lifts the gate 132 when each row of holes in the stick holder 14 is under the discharge slot 133 and permits the sticks 13 to drop out of the trough 129 and into the holes of the stick holder 14. These sticks 13 are then supported in the proper position by the belt 128. After all the sticks are in the stick holder 14 the operator sets the clamping device of the stick to clamp the sticks 13 in the stick holder 14 as described in my co-pending application. Then the stick holder 14 is passed down a chute 136 to a table where it is set upon another freezing container to receive frozen confections on the sticks 13 in the manner described in my co-pending application.

I claim:

1. [...] treating frozen confections [...] being carried [...] anism, means to distribute the frozen confections to said packaging mechanism, electrically actuated means for periodically operating said distributing means, contiguous guides connected to said distributing means and to said packaging mechanism to guide said holders to and through said distributing means and to said packaging mechanism, a conveyor to move the holders on said guides and into operative relation at the packaging mechanism, and means to actuate said conveyor intermittently in synchronism with the periodic operation of the distributing means.

2. In an apparatus for treating frozen confections and the like, said confections being carried in groups on separate holders, a separating mechanism for separating said groups of confections from said holders, a cyclically operating distributing mechanism adjacent said separating mechanism to distribute the separated confections to a packaging mechanism, said separating mechanism discharging the separated confections into said distributing mechanism, contiguous guides connected to and extended through said separating mechanism, said guides being adapted to guide said holders, conveyor means to move said holders on said guides, and electrical control means to actuate said conveyor means and start the cycle of operation of said distributor mechanism simultaneously and to stop the motion of said conveyor after each cycle of operation of said distributing mechanism.

3. In an apparatus for treating frozen confections and the like, said frozen confections being carried in groups in individual holders, a separating mechanism for separating the frozen confections from said holders, a distributing mechanism adjacent said separating mechanism for receiving the separated frozen confections and conveying the same to a packaging mechanism, a conveyor system for advancing said holders to and through said separating mechanism, and an electrical control device for intermittently operating the distributing mechanism and said conveyor system.

4. In an apparatus for treating frozen confections and the like, said frozen confections being carried in groups in individual holders, a separating mechanism for separating the frozen confections from said holders, a periodically operating distributing mechanism adjacent said separating mechanism for receiving the separated frozen confections and conveying the same to a packaging mechanism, a conveyor system for advancing said holders to and through said separating mechanism, and an electrical control device for actuating said conveyor system intermittently every time the distributing mechanism is operated.

5. An apparatus for treating frozen confections comprising a separating device, guides extending upwardly to said separating device and adapted to support and guide holders carrying groups of frozen confections, a rest guide at the lower end of said upwardly extending guides to hold at least one holder at rest, conveyors along and above said upwardly extended guide, elements on said conveyors extended to engage a holder resting on said rest guides and to pull said holder up said upwardly extended guides, means for operating said separating device intermittently and means controlled by the operation of said separating device for operating said conveyors.

6. In an apparatus for treating frozen confections, means for advancing stick holders, each of said stickholders having releasable clamping means thereon for gripping sticks embedded in frozen confections, a separating mechanism, electrically actuated means to drive said advancing mechanism, a carrier reciprocated away from said separating mechanism and back to the same to carry frozen confections released from said holders from said separating mechanism to a packaging mechanism, electrical means to operate said separating mechanism, an electric control circuit for said driving mechanism including a switch adapted to be opened by said carrier at the end of the stroke of the carrier away from said separating mechanism, and an electrical control for the operation of said separating mechanism including a normally open circuit breaker closed by said carrier in the initial position of said carrier.

7. In an apparatus for treating frozen confections and the like, said confections being carried in groups on separate holders, a distributing mechanism to distribute a group of said confections, a device for transferring a group of said frozen confections from said holders to said distributing mechanism, a conveyor for advancing said holders to said transfer device, said conveyor being electrically actuated, means for actuating said distributing mechanism to operate in a cycle, and means for electrically actuating said conveyor during each cycle of operation of said distributing mechanism.

MARLIN B. RASMUSSON.

REFERENCES CITED

The following references are of record in the file of this patent:

UNITED STATES PATENTS

| Number | Name | Date |
| --- | --- | --- |
| 1,498,872 | Hammill | June 24, 1924 |
| 1,900,355 | Maurer | Mar. 7, 1933 |
| 1,951,786 | Birr | Mar. 20, 1934 |
| 1,960,456 | Robb | May 29, 1934 |
| 1,969,833 | Beard | Aug. 14, 1934 |
| 2,003,516 | Schnaier | June 4, 1935 |
| 2,050,830 | Delany | Aug. 11, 1936 |
| 2,124,387 | Taylor | July 19, 1938 |
| 2,222,390 | Ackles | Nov. 19, 1940 |
| 2,303,013 | Wenzl, Jr. | Nov. 24, 1942 |
| 2,373,721 | Taylor et al. | Apr. 17, 1945 |